United States Patent
Nagai et al.

(10) Patent No.: US 11,260,780 B2
(45) Date of Patent: Mar. 1, 2022

(54) VEHICLE-MOUNTED SEAT DEVICE

(71) Applicant: Toyota Jidosha Kabushiki Kaisha, Toyota (JP)

(72) Inventors: Tetsuya Nagai, Okazaki (JP); Kohshi Katoh, Toyota (JP); Takashi Sugimoto, Anjyo (JP); Osamu Oda, Toyota (JP); Masatoshi Hada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/029,513

(22) Filed: Sep. 23, 2020

(65) Prior Publication Data

US 2021/0086666 A1 Mar. 25, 2021

(30) Foreign Application Priority Data

Sep. 25, 2019 (JP) .............................. JP2019-174652

(51) Int. Cl.
*B60N 2/427* (2006.01)
*B60N 2/64* (2006.01)
*B60N 2/42* (2006.01)
*B60N 2/68* (2006.01)

(52) U.S. Cl.
CPC ....... *B60N 2/42709* (2013.01); *B60N 2/4214* (2013.01); *B60N 2/64* (2013.01); *B60N 2/682* (2013.01)

(58) Field of Classification Search
CPC .... B60N 2/42709; B60N 2/4214; B60N 2/64; B60N 2/682
See application file for complete search history.

(56) References Cited

U.S. PATENT DOCUMENTS

| 9,950,646 B2* | 4/2018 | Katoh | ........................ B60N 2/68 |
| 10,988,063 B2* | 4/2021 | Katoh | ........................ B60N 2/682 |
| 2005/0140190 A1 | 6/2005 | Kawashima | |
| 2012/0119551 A1* | 5/2012 | Brncick | .................. B60N 2/646 |
| | | | 297/284.2 |
| 2016/0159254 A1* | 6/2016 | Katoh | ....................... B60N 2/66 |
| | | | 297/313 |

FOREIGN PATENT DOCUMENTS

| JP | 2005-186670 A | 7/2005 |
| JP | 2018-020597 A | 2/2018 |

* cited by examiner

*Primary Examiner* — Anthony D Barfield
(74) *Attorney, Agent, or Firm* — Dinsmore & Shohl LLP

(57) ABSTRACT

A vehicle-mounted seat device includes an SB main frame, a backrest, an SB subframe, and one or more front-back position regulation mechanisms for regulating the position of the SB subframe in the front-back direction relative to the SB main frame. Each front-back position regulation mechanism includes a front restraining bracket secured relative to the SB main frame, a rear restraining bracket secured on the SB subframe, and a front-back wire strung between the front and rear restraining brackets. The rear restraining bracket is deformed such that its front end portion is displaced rearward relative to its end portion upon input of a load greater than a predetermined load. A maximum pulling load of the front-back wire is greater than a load that causes initial deformation of the rear restraining bracket.

5 Claims, 10 Drawing Sheets

VEHICLE-MOUNTED SEAT DEVICE

CROSS REFERENCE TO RELATED APPLICATION

This application claims priority to Japanese Patent Application No. 2019-174652 filed on Sep. 25, 2019, which is incorporated herein by reference in its entirety including the specification, claims, drawings, and abstract.

TECHNICAL FIELD

This specification discloses a seat device to be mounted in a vehicle.

BACKGROUND

A vehicle-mounted seat device typically includes a seat cushion for supporting the hips of an occupant seated on the vehicle-mounted seat device (hereinafter referred to as a "seated person") and a seatback for supporting the back of the seated person. The seatback further includes a backrest on which the seated person is to lean, and a frame member for supporting the backrest. JP 2018-020597A discloses a vehicle-mounted seat device including a backrest that can swing in the right-left direction. The frame disclosed in JP 2018-020597A includes a seatback frame and a subframe. The subframe is connected to the seatback frame via a leaf spring so as to swing relative to the seatback frame. The frame has a net structure including a plurality of radially spreading linear members. The backrest is disposed forward of the net structure. With this structure, the tensile force of the linear members can provide appropriate cushioning, and the backrest can swing together with the subframe relative to the seatback frame.

Note here that, at the time of rear collision of a vehicle, a seated person may suffer cervical sprain, or so-called whiplash. Whiplash is caused by an impact at the time of rear collision that pushes the body of a seated person forward of the vehicle together with the backrest while his/her head remains as it is. Consequently, the head is caused to swing far rearward relative to the body, which damages the cervical tissues. Whiplash may likely become serious, in particular, with a seat device including a backrest supported by linear members, such as that described in JP 2018-020597A. That is, in the case of a seat device including a thick cushion member (for example, urethane mats), the body of a seated person sinks far rearward while greatly deforming the cushion member upon receipt of an impact at the time of rear collision. This results in a smaller difference in the amount of retreatment between the body and the head. In contrast, in the case of a seat device disclosed in JP 2018-020597A in which cushioning is ensured by the tensile force of the linear members supporting the backrest, the body of the seated person tends to sink only by a small amount upon receipt of an impact at the time of rear collision, which likely causes the head to swing far rearward, as compared with the body. In the case of the vehicle-mounted seat device disclosed in JP 2018-020597A, sufficient study is not conducted as to measures against whiplash.

In view of the above, this specification discloses a vehicle-mounted seat device capable of more reliable protection of a seated person at the time of rear collision.

SUMMARY

A vehicle-mounted seat device disclosed in this specification includes a seatback main frame standing in the vehicle cabin; a backrest held by being suspended from the seatback main frame with a suspension tool, the backrest being capable of swinging relative to the seatback main frame around a shaft extending in a front-back direction of a vehicle; a seatback subframe mounted on the backrest, the seatback subframe being capable of swinging together with the backrest relative to the seatback main frame; and one or more front-back position regulation mechanisms for regulating the position of the seatback subframe in the front-back direction relative to the seatback main frame, wherein each of the front-back position regulation mechanisms includes a front restraining bracket secured relative to the seatback main frame, the front restraining bracket including a front fixing portion; a rear restraining bracket secured relative to the seatback subframe, the rear restraining bracket including a rear fixing portion positioned behind the front fixing portion, and an arm portion extending from the rear fixing portion so as to detour in the up-down direction of the vehicle before extending forward to be secured on the seatback subframe; and a restraining member that is a linear member strung between the front fixing portion and the rear fixing portion, the restraining member being for regulating the rearward movement of the seatback subframe relative to the seatback main frame, the arm portion is deformed upon input of a larger load than a predetermined load such that the front end portion thereof is displaced rearward relative to the rear fixing portion, and a maximum pulling load of the restraining member is larger than a load inputted at a time when the arm portion starts deforming.

When a load larger than a predetermined load is inputted to the rear restraining bracket and the rear fixing portion is thereby displaced forward, following a rear collision, the seatback subframe can move rearward relative to the seatback main frame by an amount including an additional amount, which increases an amount by which the body can sink. This makes it easier for the body to move rearward together with the head, which enables reduction in amount by which the head swings rearward relative to the body. Consequently, it is possible to effectively reduce occurrence of whiplash, and thus to more reliably protect a seated person at the time of rear collision.

The arm portion may include a weak portion where stress is more likely concentrated than at other portions when a rearward force is applied from the forward direction of the vehicle to the backrest or the seatback subframe, and the arm portion may be bent and deformed at the weak portion upon input of the load greater than a predetermined load.

This structure enables the arm portion to deform with a simple structure.

The arm portion may include a reference portion secured relative to the seatback subframe, and an extension portion extending rearward from the rear end portion of the reference portion, the reference portion may be slidably movable rearward relative to the extension portion, and the reference portion of the arm portion may be slidably movable rearward relative to the extension portion upon input of the load greater than a predetermined load.

With a structure in which the extension portion moves sliding relative to the reference portion, it is possible to accurately control the amount of displacement of the rear fixing portion.

The one or more front-back position regulation mechanisms may include a lower front-back position regulation mechanism, and an upper front-back position regulation mechanism provided at a higher position than the lower front-back position regulation mechanism, and the arm portion of the lower front-back position regulation mechanism may start deforming upon input of a load smaller than a load that causes initial deformation of the arm portion of the upper front-back position regulation mechanism.

With this structure, the portion around the hips starts sinking at earlier timing than the timing at which the portion around the chest starts sinking. Consequently, the body is more likely caused to be in an upright posture. This makes it possible to reduce occurrence of whiplash, and also to have a seat belt and an airbag function effectively to thereby more reliably protect a seated person.

The one or more front-back position regulation mechanisms may include a lower front-back position regulation mechanism, and an upper front-back position regulation mechanism provided at a higher position than the lower front-back position regulation mechanism, and the rear fixing portion of the lower front-back position regulation mechanism may move relative to the front end portion of the arm portion of the lower front-back position regulation mechanism upon input of the load greater than a predetermined load, by an amount greater than an amount by which the rear fixing portion of the upper front-back position regulation mechanism moves relative to the front end portion of the arm portion of the upper front-back position regulation mechanism.

With this structure, the portion around the hips sinks farther than does the portion around the chest. Consequently, the body is more likely caused to be in an upright posture. This makes it possible to reduce occurrence of whiplash, and also to have a seat belt and an airbag function effectively to thereby more reliably protect a seated person.

The vehicle-mounted seat device disclosed in this specification enables more reliable protection of a seated person at the time of rear collision.

BRIEF DESCRIPTION OF DRAWINGS

Embodiment(s) of the present disclosure will be described based on the following figures, wherein.

DESCRIPTION OF EMBODIMENTS

Figure 1:
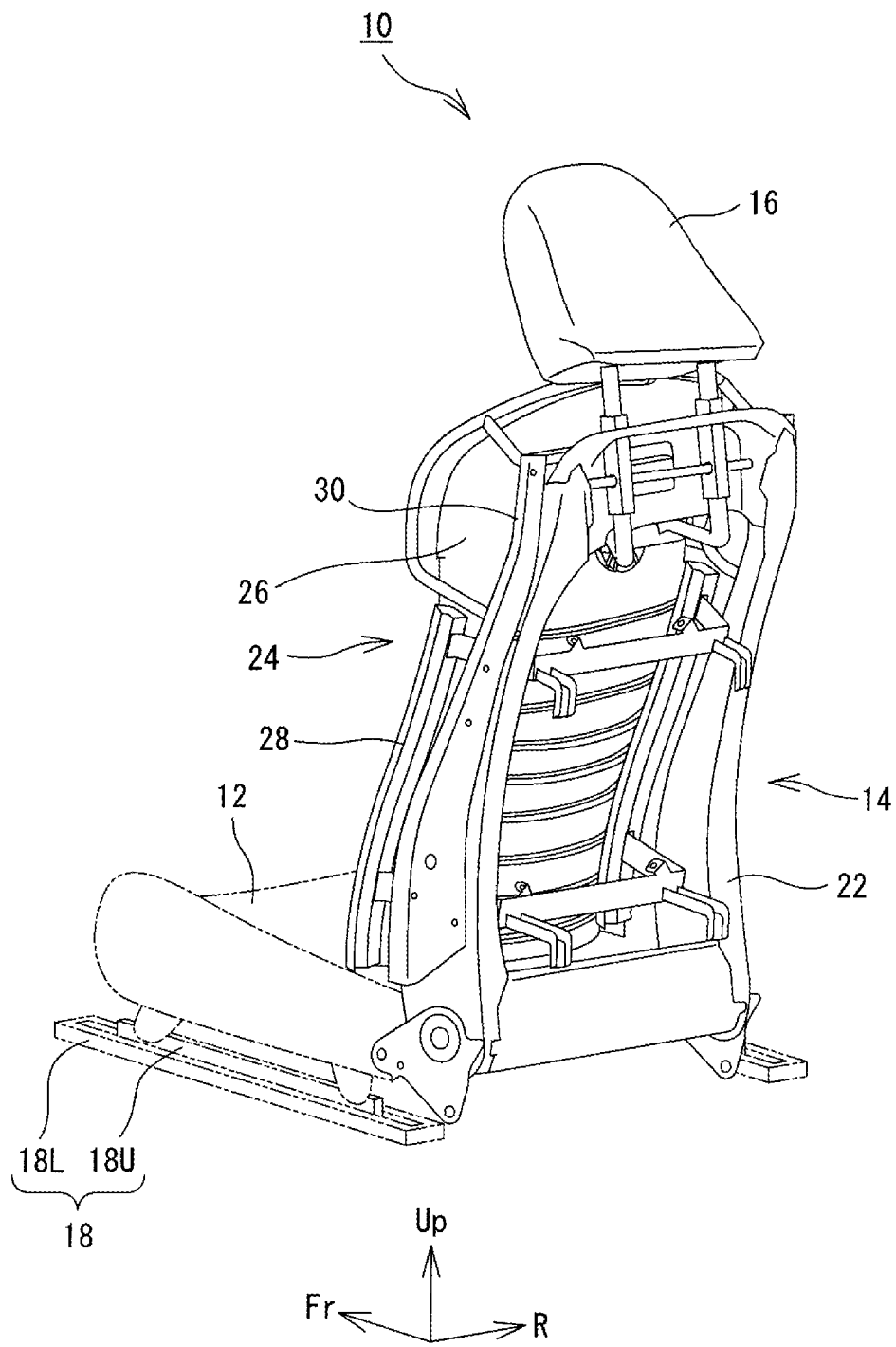
FIG. 1 is a perspective view of a vehicle-mounted seat device as viewed from diagonally rearward.
Figure 2:
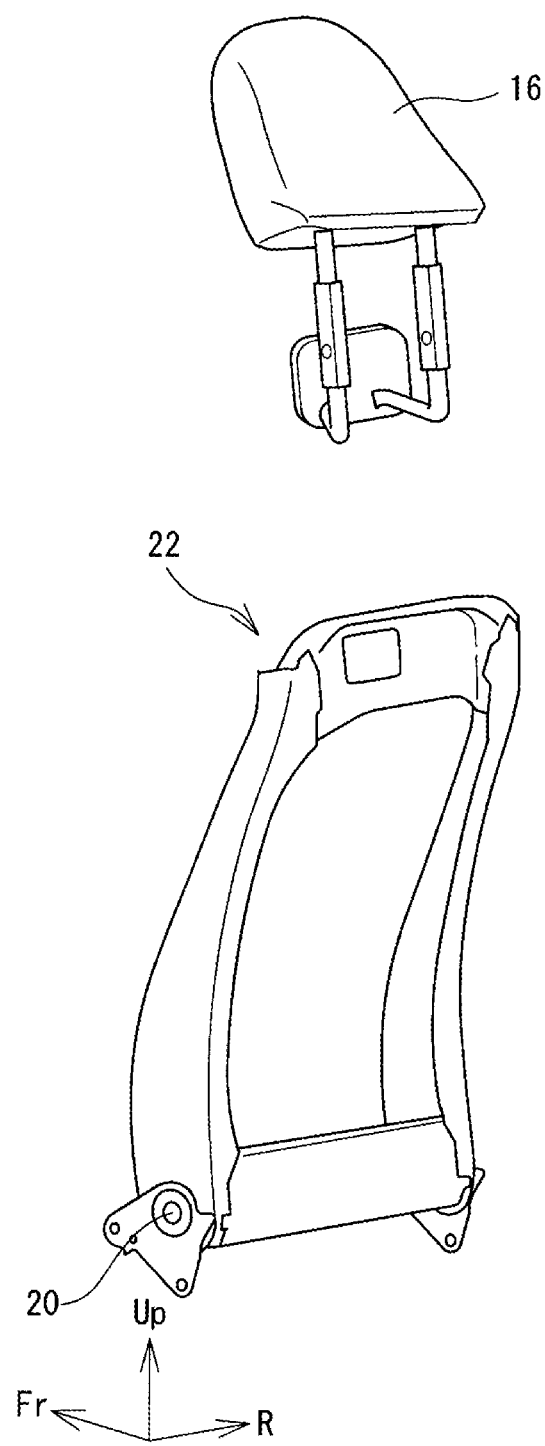
FIG. 2 is an exploded perspective view of an SB main frame and a headrest.
Figure 3:
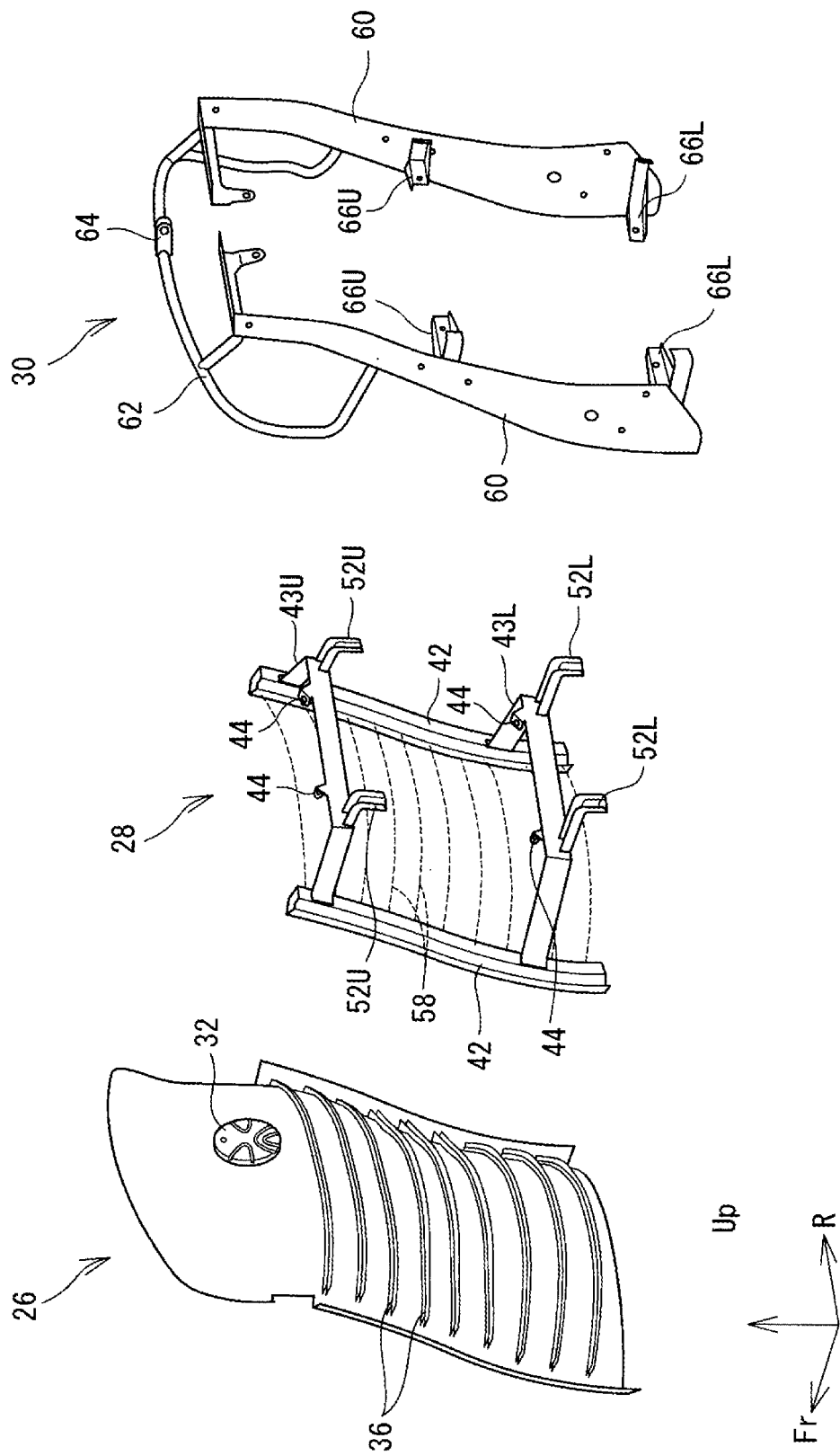
FIG. 3 is an exploded perspective view of an SB assembly.

The structure of a vehicle-mounted seat device 10 will now be described while referring to the following drawings. FIG. 1 is a perspective view of the vehicle-mounted seat device 10 viewed from diagonally rearward. FIG. 2 and FIG. 3 are exploded perspective views of a seatback 14. Note that terms such as "up/down", "front/back", and "right/left" in the following description refer to respective directions as viewed by an occupant seated on the vehicle-mounted seat device 10 (hereinafter referred to as a "seated person") unless otherwise stated. In respective drawings, "Fr", "Up", and "R" respectively refer to forward, upward, and rightward directions. A "seatback" may be hereinafter abbreviated as "SB" when necessary.

The vehicle-mounted seat device 10 is to be mounted in a vehicle, and to be used, for example, as a front seat, such as a driver seat or a passenger seat. The vehicle-mounted seat device 10 includes as main components a seat cushion 12 that supports the hips of a seated person, the seatback 14 that supports the back of the seated person, and a headrest 16 that supports the head of the seated person. In view that a known conventional technique can be referred to as to the structure of the seat cushion 12, the structure of the seat cushion 12 is not described in detail. In FIG. 1, the shape of the seat cushion 12 is only roughly illustrated. On the floor surface inside the cabin of the vehicle, a slide rail 18 is installed. The slide rail 18 includes a lower rail 18L secured on the floor surface of the cabin and extending in the front-back direction, and an upper rail 18U slidable along the lower rail 18L. The seat cushion 12 is connected to the upper rail 18U at its four corners, which makes the vehicle-mounted seat device 10 slidable in the front-back direction.

The headrest 16 is a member provided above the seatback 14 to support the head of a seated person. The seatback 14 includes as main components an SB main frame 22 and an SB assembly 24. The SB main frame 22 is a frame member standing in the cabin and made of highly rigid metal material (for example, steel). As illustrated in FIG. 2, the SB main frame 22 includes four connected upper, lower, right, and left frame members that together define a substantially rectangular shape when viewed from the front. Near the lower end of the SB main frame 22, a reclining shaft 20 is provided extending in the right-left direction. The SB main frame 22 is swingably connected to the seat cushion 12 via the reclining shaft 20. Specifically, the SB main frame 22 swings around the reclining shaft 20 as the center, whereby the entire seatback 14 can swing (that is, recline) relative to the seat cushion 12.

FIG. 3 is an exploded perspective view of the SB assembly 24. The SB assembly 24 is formed by combining a backrest 26, an SB subframe 28, and an SB middle frame 30. The SB middle frame 30 is a frame member secured on the SB main frame 22, and is not movable in position relative to the SB main frame 22. The backrest 26 is a thin panel member on which the back of a seated person is to lean. The backrest 26 is held suspended from the SB middle frame 30, and can swing relative to the SB middle frame 30 and thus the SB main frame 22. The SB subframe 28 is provided behind the backrest 26, and can swing together with the backrest 26 relative to the SB middle frame 30 and thus the SB main frame 22.

More specifically, the SB middle frame 30 includes a pair of side frames 60 extending in the up-down direction, and a support pipe 62 extending between the pair of side frames 60. Each side frame 60 is placed on the outer surface of the SB main frame 22 and fastened to the SB main frame 22 with bolts. Near the lower end of the side frame 60 and the middle of the side frame 60 in the height direction, upper front restraining brackets 66U and lower front restraining brackets 66L (hereinafter to be referred to as "front restraining brackets 66" when discrimination between upper and lower ones is not made) are secured with securing mechanism, such as welding. The front restraining bracket 66 is a bracket to which the front end portion of a front-back wire 82, to be described later, is secured. A specific structure of the front restraining bracket 66 will be described later.

The backrest 26 is a member for supporting the back of a seated person, and is curved in accordance with the shape of the back of a person. On the back surface of the backrest 26 at the center in the right-left direction, a relay disk 32 is secured. The relay disk 32 is positioned higher than the center of the backrest 26 in the height direction and substantially as high as the shoulder blades of a seated person. The relay disk 32 is a low-profile disk member whose diameter is sufficiently larger than its size in its axial direction. On the surface of the relay disk 32, there are formed grooves or slits in which radial wires 74, to be described later, are to be hooked. On the rear surface of the backrest 26 below the relay disk 32, a plurality of wire guides 36 are disposed at intervals in the up-down direction. Each wire guide 36 indicates a position where to dispose a lateral wire 58 to be described later, and includes ribs standing from the rear surface of the backrest 26.

The SB subframe 28 is a frame member mounted on the rear surface of the backrest 26. The SB subframe 28 includes a pair of vertical frames 42, an upper lateral frame 43U, and a lower lateral frame 43L (hereinafter referred to as "lateral frames 43" when discrimination between upper and lower ones is not made), and a plurality of the lateral wires 58. The vertical frames 42 are frame members extending in the up-down direction, and are mounted on the respective right and left end portions of the backrest 26. The lateral frame 43 connects the pair of vertical frames 42.

The lateral frame 43 projects further rearward than the vertical frame 42; that is, toward the SB middle frame 30, such that the lateral frame 43 defines a substantially inverted C-shape in a top view. On the upper lateral frame 43U, a pair of upper rear restraining brackets 52U and a pair of wire retaining end portions 44 are secured. Meanwhile, on the lower lateral frame 43L, a pair of lower rear restraining brackets 52L (hereinafter referred to as "rear restraining brackets 52" when discrimination between upper and lower ones is not made) and a pair of wire-retaining end portions 44 are secured.

The wire-retaining end portion 44 is a portion where a lower wire 80 (the radial wire 74), to be described later, is retained. The rear restraining bracket 52 is a portion where the rear end portion of the front-back wire 82, to be described later, is secured. The lateral wire 58 is a wire strung between the pair of vertical frames 42. The lateral wire 58 supports the backrest 26 from its behind to bear the load applied from a seated person.

Figure 4:
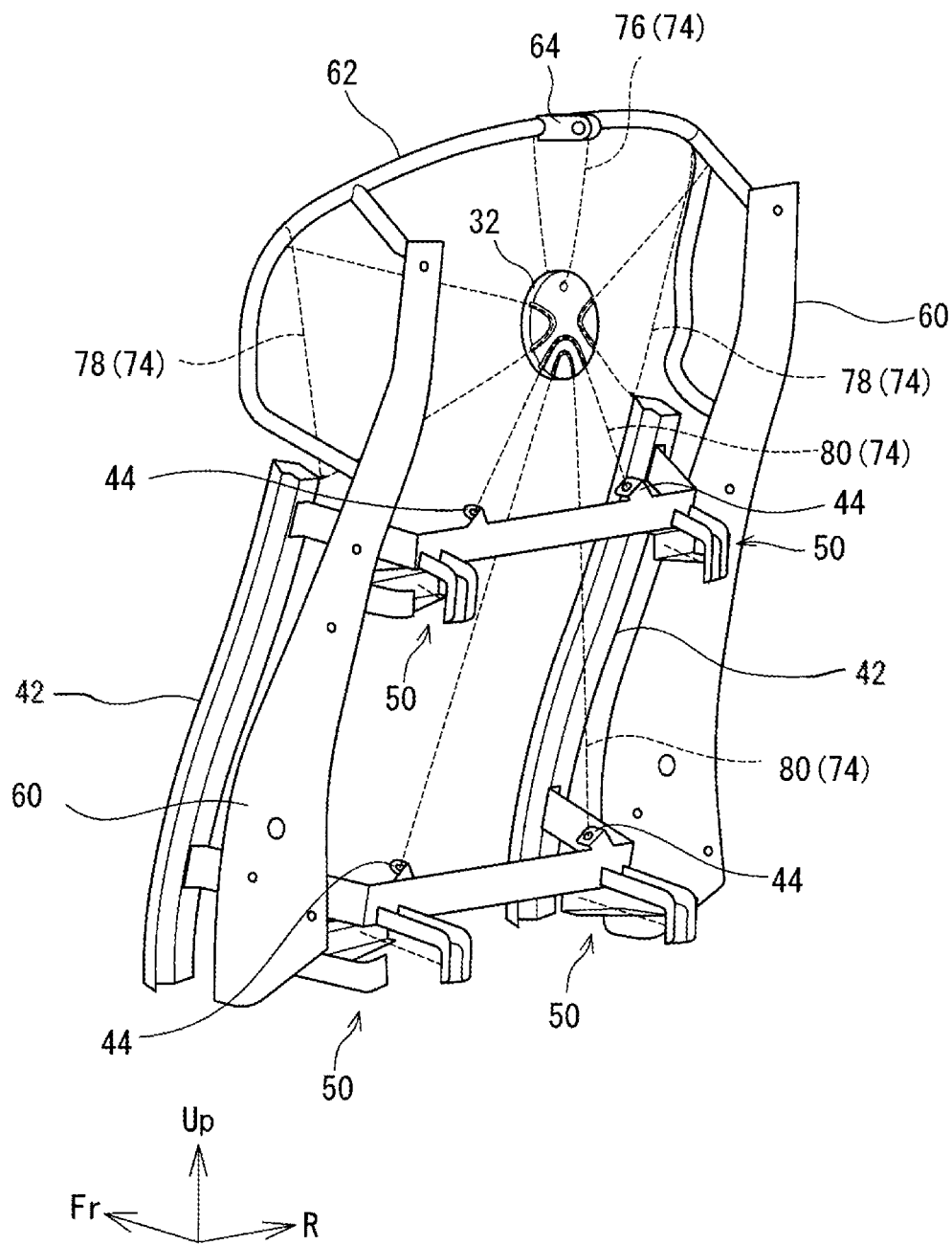
FIG. 4 illustrates wires being strung.
Figure 5:
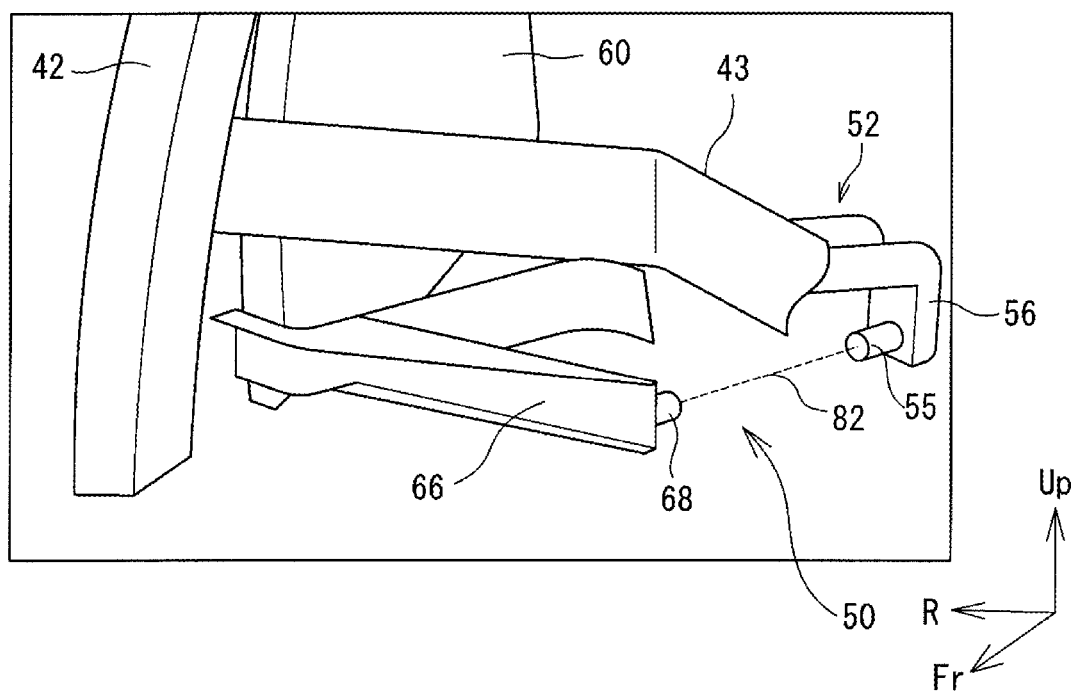
FIG. 5 is a schematic perspective view of a front-back position regulation mechanism.

Referring to FIG. 4 and FIG. 5, various manners of stringing various wires for supporting the backrest 26 or regulating the position of the backrest 26 will now be described. FIG. 4 illustrates wires strung. FIG. 5 is a perspective view of a front-back position regulation mechanism 50 and portions therearound. In FIG. 4, the backrest 26 and the lateral wire 58 are not illustrated.

As is obvious from FIG. 4, a plurality of wires extend radially from the relay disk 32. These plurality of radially extending wires will be hereinafter collectively referred to as radial wires 74. Each radial wire 74 functions as a suspension tool for holding the backrest 26 suspended. The radial wires 74 include one upper wire 76, a pair of right and left wires 78, and two lower wires 80. The upper wire 76 is a ring wire suspended from a pulley 64 and passing through a hole formed on the relay disk 32. With the upper wire 76, the relay disk 32 and thus the backrest 26 are held suspended. Note that the support pipe 62, on which the pulley 64 is mounted, is a part of the SB middle frame 30, and the position of the support pipe 62 relative to the SB main frame 22 is fixed. Being suspended from the pulley, the backrest 26 can swing relative to the SB main frame 22. The lower wire 80 is a wire passing through the relay disk 32 so as to be bent into a U-shape such that its respective ends descend from the relay disk 32. The respective end portions of each lower wire 80 are secured to the pair of wire-retaining end portions 44 provided to the lateral frames 43.

The two right and left wires 78 are strung in a right-left symmetrical manner. Each of the right and left wires 78 is a ring wire, and is strung so as to define a substantial triangle by passing through the relay disk 32, the upper end portion of the vertical frame 42, and a portion of the support pipe 62 on the extension from the relay disk 32 in a corresponding right or left diagonally forward direction. As the two right and left wires 78 are strung in a right and left symmetrical manner, the backrest 26 is naturally positioned at a neutral position where the tensile forces of the two right and left wires 78 balance.

As described above, the positions of the relay disk 32 and the backrest 26 having the relay disk 32 secured thereon, relative to the SB middle frame 30 (and thus the SB main frame 22), are restrained by the plurality of radial wires 74. This restraint, however, is not rigid. That is, when the radial wires 74 flex or incline moderately, the backrest 26 and the SB subframe 28 mounted on the backrest 26 can swing relative to the SB main frame 22 with the relay disk 32 as the center.

In order to regulate the position in the front-back direction of the backrest 26, one or more (four in this example) front-back position regulation mechanisms 50 are provided to the vehicle-mounted seat device 10. As illustrated in FIG. 5, each front-back position regulation mechanism 50 includes a front restraining bracket 66 provided to the SB middle frame 30, the rear restraining bracket 52 provided to the SB subframe 28, and the front-back wire 82. The front restraining bracket 66 is a bracket mounted on the front end portion of the side frame 60 of the SB middle frame 30. On a part of the front restraining bracket 66, a substantially cylindrical front fixing portion 68 is mounted extending rearward. The front end portion of the front-back wire 82 is secured on the front fixing portion 68.

The rear restraining bracket 52 is a bracket to be mounted on the lateral frame 43 of the SB subframe 28. The rear restraining bracket 52 roughly includes a rear fixing portion 55, on which the rear end portion of the front-back wire 82 is secured, and an arm portion 56 extending from the rear fixing portion 55 so as to detour upward before further extending forward to be secured to the lateral frame 43. The rear fixing portion 55 is positioned behind and substantially directly opposed to the front fixing portion 68. The arm portion 56 is a substantially L-shaped member that is bent midway. At the bent portion of the arm portion 56, a weak portion where stress is more likely concentrated than other portions is formed, as will described later.

The front-back wire 82 is a wire whose front end portion is secured to the front fixing portion 68 and whose rear end portion is secured to the rear fixing portion 55. This strung front-back wire 82 regulates the rearward movement of the backrest 26 and the SB subframe 28. That is, the front-back wire 82 functions as a restraining member for regulating the rearward movement of the SB subframe 28 relative to the SB main frame 22.

With the vehicle-mounted seat device 10 having the above-described structure, the backrest 26 can swing relative to the SB main frame 22 around the front-back axis. In this case, rightward and leftward swings caused when a vehicle is running can be absorbed not by the motion of the head of the seated person but by the motion of a body, which can stabilize the posture of the head of a seated person. Moreover, as the backrest 26, on which the back of a seated person is to lean, is supported by a plurality of wires, it is possible to provide suitable cushioning even without a thick cushion member (for example, a urethane seat), which enables reduction in weight of the vehicle-mounted seat device 10.

Note here that a seated person may suffer cervical strain; that is, so-called whiplash, at the time of rear collision of a vehicle, depending on the structure of the vehicle-mounted seat device 10. Specifically, whiplash is a disorder caused when the body is pushed forward by the seatback 14 while the head remains as it is at the time of rear collision, and consequently, the head swings far rearward relative to the body, whereby the cervical vertebrae, which support the head, are damaged. In a structure in which the backrest 26 is supported with wires, in particular, the body of a seated person sinks rearward only by an amount in the range permitted by the tensile force of the wires. Consequently, the head of the seated person tends to swing far relative to his/her body in the case of a structure in which the backrest 26 is supported with wires, as compared with a structure including a thick cushion member.

Figure 6:
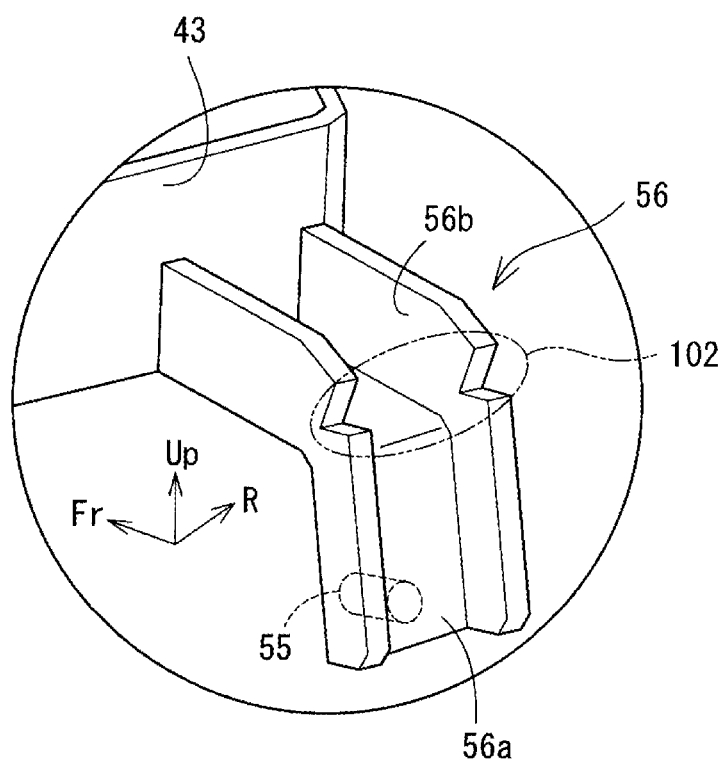
FIG. 6 is a perspective view of a rear restraining bracket.

To address the above, in this specification, the backrest 26 is caused to sink far rearward at the time of rear collision in order to prevent occurrence of or reduce the damage caused by whiplash. This will be described below in detail. As described above, the front-back position regulation mechanism 50 includes the rear restraining bracket 52 to be secured relative to the SB subframe 28, the front restraining bracket 66 to be secured relative to the SB main frame 22, and the front-back wire 82 strung between the respective restraining brackets 52, 66. FIG. 6 is a perspective view of the rear restraining bracket 52. As described above and illustrated in FIG. 6, the rear restraining bracket 52 includes the substantially L-shaped arm portion 56 and the rear fixing portion 55 provided to the leading end portion of the arm portion 56. Further, the arm portion 56 includes a thin panel main portion 56a, and railing portions 56b standing from the respective sides of the main portion. Provision of the railing portions 56b enhances the strength of the arm portion 56. The rear fixing portion 55 is a substantially cylindrical member mounted on an end portion of the arm portion 56. Alternatively, the rear end portion of the front-back wire 82 may be secured directly to an end portion of the arm portion 56 without providing such a cylindrical member. In this case, the end portion of the arm portion 56 functions as the rear fixing portion 55.

The arm portion 56 in this example has a weak portion 102 where stress is likely concentrated when a rearward force is applied from the forward of the vehicle to the backrest 26 or the SB subframe 28. In this example, as illustrated in FIG. 6, a notch is formed on the railing portion 56b at the bent portion to thereby constitute the weak portion 102. The weak portion 102 may have a different structure. For example, the main portion 56a at the bent portion may be thinner than other portions, or a notch may be formed in the main portion 56a at the bent portion, to thereby constitute the weak portion 102.

Figure 7:
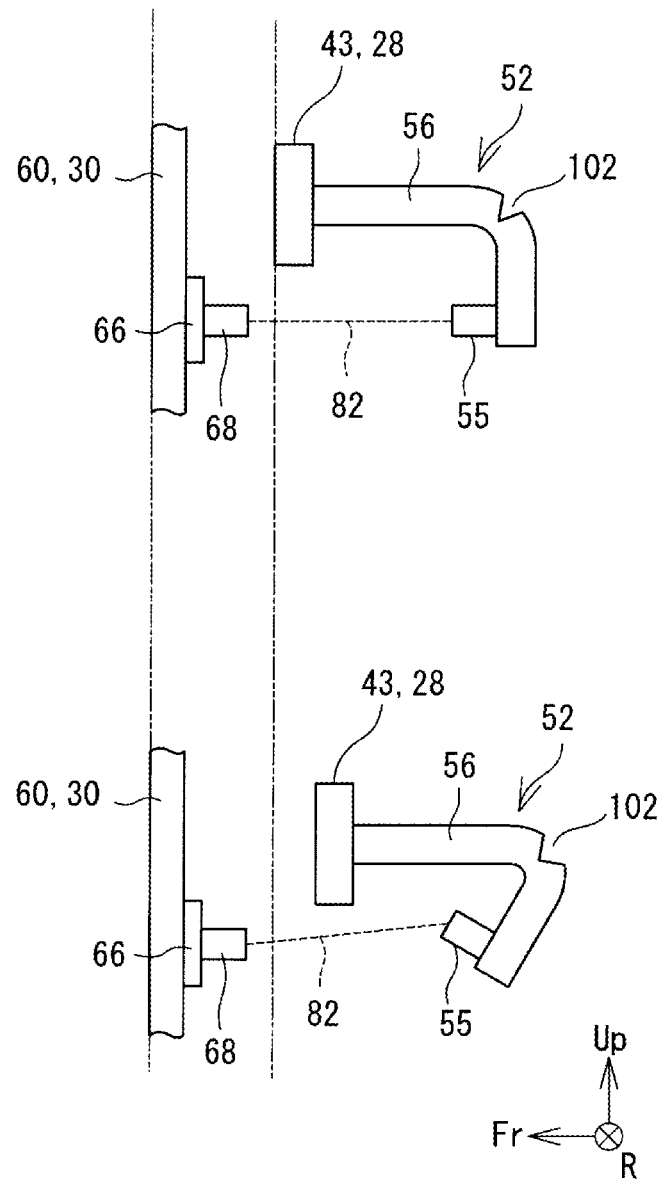
FIG. 7 is a schematic side view of a front-back position regulation mechanism.

The movement of the front-back position regulation mechanism 50 having the above-described structure will now be described while referring to FIG. 7. FIG. 7 is a schematic side view of the front-back position regulation mechanism 50. The upper illustration in FIG. 7 relates to a normal state, while the lower illustration relates to the time of rear collision. As shown in the upper illustration in FIG. 7, in a normal state, the front fixing portion 68 is directly opposed to the rear fixing portion 55, and the front-back wire 82 is strung between the respective fixing portions 68, 55. The SB subframe 28 including the lateral frame 43 is regulated by the front-back wire 82 so as not to move rearward by an amount in excess of a predetermined amount.

At the time of rear collision, the SB main frame 22 moves forward together with the vehicle body, while a seated person remains where he/she is. In other words, the seated person moves rearward relative to the SB main frame 22. The backrest 26 and the SB subframe 28 as well, which support the seated person, move rearward relative to the SB main frame 22. In the case where the rear restraining bracket 52 is sufficiently rigid, however, the relative rearward movement of the SB subframe 28 is regulated by the front-back wire 82, and the body of the seated person does not sink sufficiently. In this case, only the head of the seated person moves rearward relative to the body, which likely causes whiplash.

In this example, the weak portion 102 is provided to the arm portion 56 of the rear restraining bracket 52, as described above. Consequently, when the SB subframe 28 moves rearward relative to the SB main frame 22 and a load is thereby applied to the arm portion 56, stress will be concentrated on the weak portion 102. Thus, the weak portion 102 bends, as shown in the lower illustrated in FIG. 7; the arm portion 56 thereby bends into a V-shape; and the front end portion of the arm portion 56 is displaced rearward relative to the rear fixing portion 55. In this case, the SB subframe 28 is allowed to move rearward relative to the SB main frame 22 by an amount corresponding to an amount by which the front end portion of the arm portion 56 is displaced rearward. This resultantly increases the amount by which the body of a seated person sinks at the time of rear collision. The increase in the amount by which the body of a seated person sinks and the readiness with which the body moves together with the head can accordingly effectively prevent occurrence of or reduce the damage of whiplash. Note that as the buckling load of the weak portion 102 is smaller than a load which the front-back wire 82 can tolerate against tension, or a maximum tensile load, the weak portion 102 is bent and deformed before the front-back wire 82 is broken by being pulled. This prevents the body of a seated person from limitlessly moving rearward at the time of rear collision.

Figure 8:
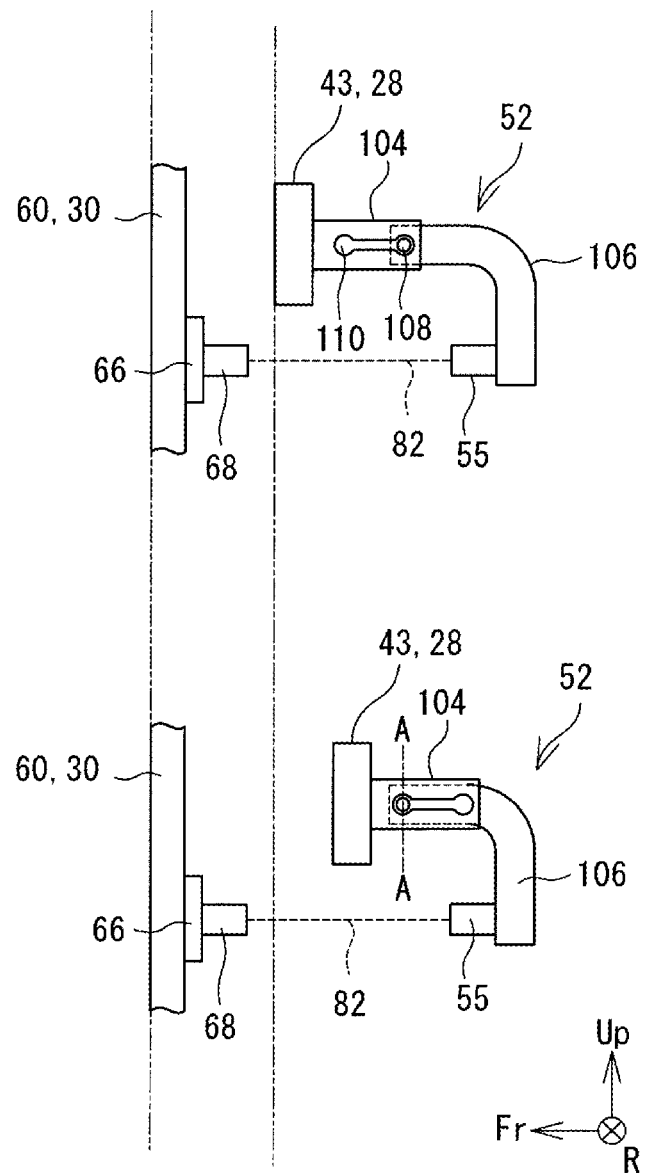
FIG. 8 is a schematic side view of another example of a front-back position regulation mechanism.

In this example, provision of the weak portion 102 in the arm portion 56 induces deformation of the arm portion 56. The arm portion 56, however, may have a different structure, provided that the structure can cause the front end portion of the arm portion 56 to move rearward relative to the rear fixing portion 55 to be thereby deformed upon input of a rearward load greater than a predetermined load. For example, as illustrated in FIG. 8, the arm portion 56 may include a reference portion 104 secured relative to the SB subframe 28 and an extension portion 106 extending rearward from the rear end portion of the reference portion 104. In this case, the reference portion 104 is slidable relative to the extension portion 106.

Figure 9:
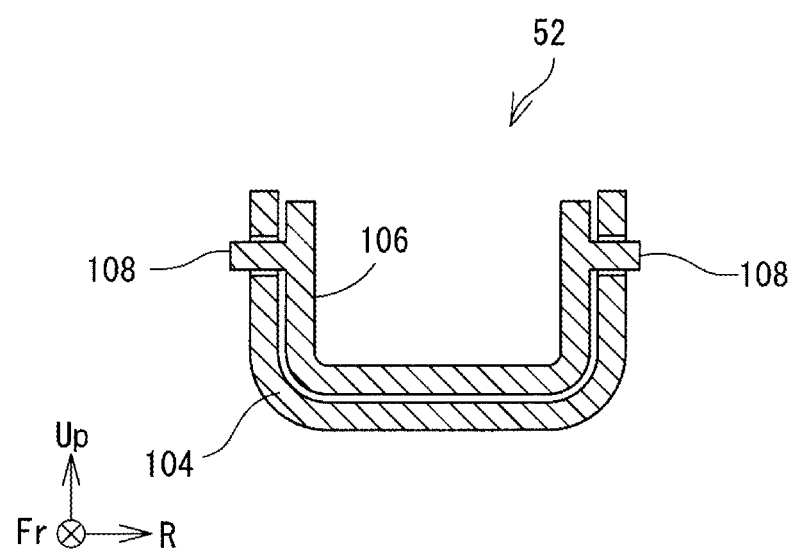
FIG. 9 is a schematic cross sectional view along line A-A in FIG. 8.

FIG. 9 is a schematic cross sectional view along line A-A in FIG. 8. As illustrated in FIG. 9, each of the reference portion 104 and the extension portion 106 has a substantially C shape that is open upward. The extension portion 106 is smaller than the reference portion 104 and disposed inside the reference portion 104. Guide shafts 108 extend from side surfaces of the extension portion 106. As illustrated in FIG. 8, a guide slit 110 is formed on the side surface of the reference portion 104 so at to extend in the front-back direction for insertion of the guide shaft 108 therein. Only the front and rear end portions of the guide slit 110 are large, and the middle portion of the guide slit 110 is slightly smaller than the outer diameter of the guide shaft 108. Thus, the guide shaft 108 remains in the rear end portion of the guide slit 110 when no large load is applied, as shown in the upper illustration in FIG. 8.

Meanwhile, when a rearward force greater than a predetermined force is inputted into the arm portion 56 at the time of rear collision, as shown in the lower illustration in FIG. 8, the guide shaft 108 overcomes the narrower portion of the guide slit 110 to move to the front end portion of the guide slit 110. In the above, the extension portion 106 as well, connected to the guide shaft 108, moves forward relative to the reference portion 104. In other words, the reference portion 104 moves sliding rearward relative to the extension portion 106. Consequently, the front end portion of the arm portion 56 moves rearward relative to the rear fixing portion. This movement increases the amount by which the backrest 26 can sink, which prevents occurrence of and reduces the damage of whiplash.

Note that in this example there are provided four front-back position regulation mechanisms 50; namely, two around the height of the chest of a seated person and two around the height of the hips. The four front-back position regulation mechanisms 50 may all have the same structure or different structures. For example, the structures of the front-back position regulation mechanisms 50 may be different from one another such that the front-back position regulation mechanism 50 provided around the height of the hips starts deforming earlier and deforms to a greater extent than does the front-back position regulation mechanism 50 provided around the height of the chest. This will be described below while referring to FIG. 10.

Figure 10:
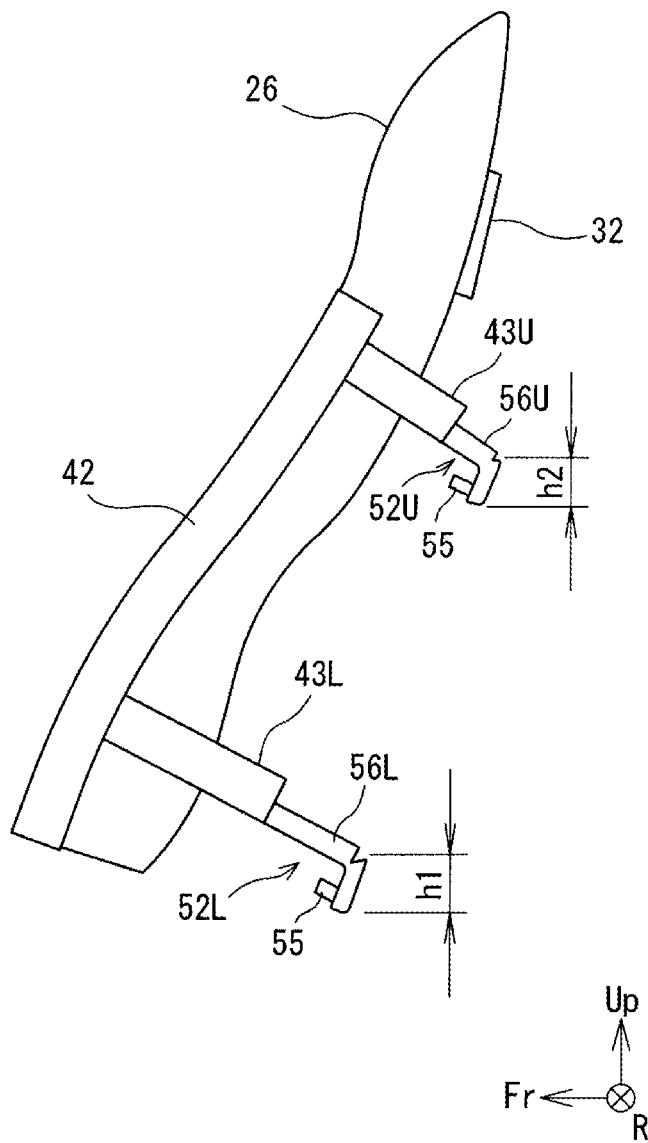
FIG. 10 is a schematic side view of a backrest and an SB subframe.

FIG. 10 is a schematic side view of the backrest 26 and the SB subframe 28. When a large amount is ensured for the hips of a seated person to sink at the time of rear collision, impacts at collision can be absorbed. This enables more reliable prevention of occurrence of whiplash. In addition, when the hips are retreated farther than the chest to thereby have the body of the seating person further upright, it is possible to extract maximum capability of a seatbelt and of an airbag. In this view, in order to increase the amount of sinking of the hips and portions therearound, the upper rear restraining brackets 52U and the lower rear restraining brackets 52L may have different structures.

Specifically, the arm portion 56 of the lower rear restraining bracket 52L (hereinafter referred to as a "lower arm portion 56L") may be configured so as to start deforming upon input of a small load, as compared with the arm portion 56 of the upper rear restraining bracket 52U (hereinafter referred to as an "upper arm portion 56U"). In the case where each arm portion 56 has such a structure as is illustrated in FIG. 7, this is achievable by forming a larger notch on the weak portion 102 of the lower arm portion 56L than that on the weak portion 102 of the upper arm portion 56U. As an alternative configuration, the lower arm portion 56L may be made from material less rigid than that of the upper arm portion 56U. Further, in the case where each arm portion 56 has such a structure as is illustrated in FIG. 8, the lower arm portion 56L may be configured so as to start deforming at earlier timing than the upper arm portion 56U, by adjusting the amount by which the middle portion of the guide slit 110 is narrowed.

Still alternatively, the lower arm portion 56L may be configured so as to be deformed to a greater extent at the time of rear collision than is the upper arm portion 56U. In the case where each arm portion 56 has such a structure as illustrated in FIG. 7, this is achievable by making the height h1 of the lower arm portion 56L higher than the height h2 of the upper arm portion 56U. In addition, in the case where each arm portion 56 has such a structure as illustrated in FIG. 8, the guide slit 110 of the lower arm portion 56L may be longer than the guide slit 110 of the upper arm portion 56U.

By setting different amounts of deformation and different values of load that causes initial deformation of the arm portion 56, depending on the height where the arm portion 56 is disposed, as described above, it is possible to reliably prevent occurrence of whiplash. In addition, as such different settings make it possible to have the body of a seated person further upright at the time of rear collision, it is possible to enhance the effect of a seatbelt or an airbag, which enables further appropriate protection of a seated person.

Note that the above-described structure is a mere example, and there may be employed structures other than a structure including the rear restraining bracket 52 that can deform in a such a direction that increases the amount by which a seated person can sink at the time of rear collision. For example, although in the above description the swingable headrest 16 is provided, the headrest 16 is omissible. Further, although in the above description the backrest 26 is held suspended from the SB main frame 22 via the SB middle frame 30, the SB middle frame 30 may be omitted and the backrest 26 may be suspended directly from the SB main frame 22. Still further, although in the above description a wire is used as a restraining member that regulates the position of the SB subframe 28 in the front-back direction, the restraining member may be of any types, such as, for example, other types of linear members, such as ropes, strings, or climbing ropes, so forth, other than wires.

REFERENCE SIGNS LIST 10 vehicle-mounted seat device, 12 seat cushion, 14 seatback, 16 headrest, 18 slide rail, 20 reclining shaft, 22 SB main frame, 24 SB assembly, 26 backrest, 28 SB subframe, 30 SB middle frame, 32 relay disk, 36 wire guide, 42 vertical frame, 43 lateral frame, 44 wire-retaining end portion, 50 front-back position regulation mechanism, 52 rear restraining bracket, 55 rear fixing portion, 56 arm portion, 58 lateral wire, 60 side frame, 62 support pipe, 64 pulley, 66 front restraining bracket, 68 front fixing portion, 74 radial wire, 76 upper wire, 78 right and left wires, 80 lower wire, 82 front-back wire, 102 weak portion, 104 reference portion, 106 extension portion, 108 guide shaft, 110 guide slit.

The invention claimed is:

1. A vehicle-mounted seat device, comprising;
a seatback main frame standing in a vehicle cabin;
a backrest held by being suspended from the seatback main frame with a suspension tool, the backrest being capable of swinging relative to the seatback main frame around a shaft extending in a front-back direction of a vehicle;
a seatback subframe mounted on the backrest, the seatback subframe being capable of swinging together with the backrest relative to the seatback main frame; and
one or more front-back position regulation mechanisms for regulating a position of the seatback subframe in a front-back direction relative to the seatback main frame;
wherein
each of the front-back position regulation mechanisms includes a front restraining bracket secured relative to the seatback main frame, the front restraining bracket including a front fixing portion;

a rear restraining bracket secured relative to the seatback subframe, the rear restraining bracket including a rear fixing portion positioned behind the front fixing portion, and an arm portion extending from the rear fixing portion so as to detour in an up-down direction of the vehicle before extending forward to be secured on the seatback subframe; and a restraining member that is a linear member strung between the front fixing portion and the rear fixing portion, the restraining member being for regulating rearward movement of the seatback subframe relative to the seatback main frame, the arm portion is deformed upon input of a load greater than a predetermined load such that a front end portion thereof is displaced rearward relative to the rear fixing portion, and a maximum pulling load of the restraining member is greater than a load inputted at a time when the arm portion starts deforming.

2. The vehicle-mounted seat device according to claim 1, wherein the arm portion includes a weak portion where stress is more likely concentrated than at other portions when a rearward force is applied from forward of the vehicle to the backrest or the seatback subframe, and the arm portion is bent and deformed at the weak portion upon input of the load greater than the predetermined load.

3. The vehicle-mounted seat device according to claim 1, wherein the arm portion includes a reference portion secured relative to the seatback subframe and an extension portion extending rearward from a rear end portion of the reference portion, the reference portion is slidably movable rearward relative to the extension portion, and the reference portion of the arm portion is slidably movable rearward relative to the extension portion upon input of the load greater than the predetermined load.

4. The vehicle-mounted seat device according to claim 1, wherein the one or more front-back position regulation mechanisms include a lower front-back position regulation mechanism, and an upper front-back position regulation mechanism provided at a higher position than the lower front-back position regulation mechanism, and the arm portion of the lower front-back position regulation mechanism starts deforming upon input of a load smaller than the load that causes initial deformation of the arm portion of the upper front-back position regulation mechanism.

5. The vehicle-mounted seat device according to claim 1, wherein the one or more front-back position regulation mechanisms include a lower front-back position regulation mechanism, and an upper front-back position regulation mechanism provided at a higher position than the lower front-back position regulation mechanism, and the rear fixing portion of the lower front-back position regulation mechanism moves relative to a front end portion of the arm portion of the lower front-back position regulation mechanism upon input of the load greater than the predetermined load by which the rear fixing portion of the upper front-back position regulation mechanism moves relative to a front end portion of the arm portion of the upper front-back position regulation mechanism.

\* \* \* \* \*